US012630668B2

(12) United States Patent
Suzuki et al.

(10) Patent No.: US 12,630,668 B2
(45) Date of Patent: May 19, 2026

(54) LIQUID COMPRESSION MOLDING MATERIAL

(71) Applicant: NAMICS CORPORATION, Niigata (JP)

(72) Inventors: Makoto Suzuki, Niigata (JP); Tsuyoshi Kamimura, Niigata (JP); Yosuke Sakai, Niigata (JP)

(73) Assignee: NAMICS CORPORATION, Niigata (JP)

( * ) Notice: Subject to any disclaimer, the term of this patent is extended or adjusted under 35 U.S.C. 154(b) by 648 days.

(21) Appl. No.: 17/926,965

(22) PCT Filed: Apr. 20, 2021

(86) PCT No.: PCT/JP2021/016031
§ 371 (c)(1),
(2) Date: Nov. 21, 2022

(87) PCT Pub. No.: WO2021/261064
PCT Pub. Date: Dec. 30, 2021

(65) Prior Publication Data

US 2023/0203236 A1 Jun. 29, 2023

(30) Foreign Application Priority Data

Jun. 23, 2020 (JP) ................................ 2020-107776

(51) Int. Cl.
*C08G 59/02* (2006.01)
*B29C 43/00* (2006.01)
(Continued)

(52) U.S. Cl.
CPC ............ *C08G 59/02* (2013.01); *B29C 43/003* (2013.01); *C08G 59/1444* (2013.01); *C08K 3/36* (2013.01);
(Continued)

(58) Field of Classification Search
None
See application file for complete search history.

(56) References Cited

U.S. PATENT DOCUMENTS

| | | | | |
|---|---|---|---|---|
| 2017/0005021 | A1 | 1/2017 | Kohara et al. | |
| 2019/0233672 | A1* | 8/2019 | Takeuchi | C08L 63/00 |
| 2020/0181392 | A1* | 6/2020 | Inoue | C08K 3/00 |
| 2020/0194325 | A1 | 6/2020 | Inoue et al. | |
| 2021/0054187 | A1 | 2/2021 | Oi et al. | |

FOREIGN PATENT DOCUMENTS

| | | | |
|---|---|---|---|
| CN | 110770275 | A | 2/2020 |
| JP | H01188519 | A | 7/1989 |
| JP | 2004087852 | A * | 3/2004 |

(Continued)

OTHER PUBLICATIONS

International Search Report (ISR) (and English translation thereof) dated Jul. 13, 2021, issued in International Application No. PCT/JP2021/016031.
Written Opinion dated Jul. 13, 2021, issued in International Application No. PCT/JP2021/016031.

(Continued)

*Primary Examiner* — Ha S Nguyen
(74) *Attorney, Agent, or Firm* — Holtz, Holtz & Volek PC

(57) ABSTRACT

A method for producing a semiconductor element by wafer-level chip-size packaging includes applying a liquid compression molding material to a wafer after completion of circuit formation and subjecting the wafer to sealing treatment by compression molding. The liquid compression molding material includes (A) an epoxy resin; (B) a curing agent; and (C) a filler. The liquid compression molding material having a thixotropic index (TI) of 0.8 to 4.0.

8 Claims, 1 Drawing Sheet

(51) Int. Cl.

| | |
|---|---|
| ***B29K 63/00*** | (2006.01) |
| ***B29K 105/00*** | (2006.01) |
| ***C08G 59/14*** | (2006.01) |
| ***C08G 59/20*** | (2006.01) |
| ***C08G 59/40*** | (2006.01) |
| ***C08G 59/62*** | (2006.01) |
| ***C08K 3/36*** | (2006.01) |
| ***C08K 9/06*** | (2006.01) |
| ***C08L 63/00*** | (2006.01) |
| ***H10W 74/10*** | (2026.01) |
| ***H10W 74/40*** | (2026.01) |

(52) U.S. Cl.

CPC ..................... *B29K 2063/00* (2013.01); *B29K 2105/0094* (2013.01); *C08K 2201/005* (2013.01)

(56) References Cited

FOREIGN PATENT DOCUMENTS

| | | | | | |
|---|---|---|---|---|---|
| JP | 2011089025 | A | * | 5/2011 | |
| JP | 2015105304 | A | | 6/2015 | |
| WO | 2018221681 | A1 | | 12/2018 | |
| WO | WO-2018221682 | A1 | * | 12/2018 | ............ C08G 59/20 |
| WO | 2019146617 | A1 | | 8/2019 | |

OTHER PUBLICATIONS

Chinese Office Action (and an English language translation thereof) dated Jun. 30, 2025, issued in counterpart Chinese Application No. 202180037581.4.

Korean Office Action (and an English language translation thereof) dated Dec. 11, 2025, issued in corresponding Korean Application No. 10-2022-7043664.

* cited by examiner

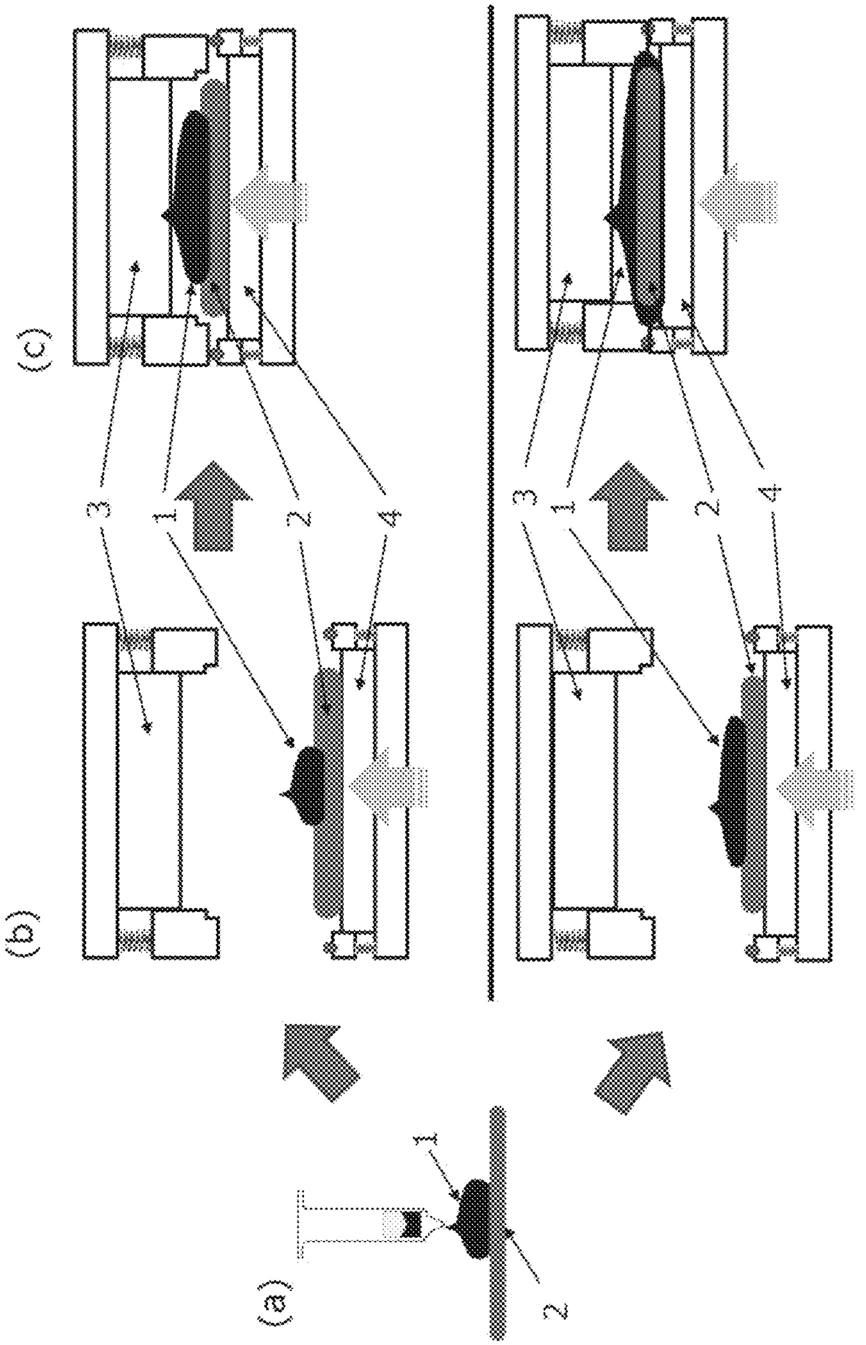
(a)
(b)
(c)
1
2
3
4

LIQUID COMPRESSION MOLDING MATERIAL

TECHNICAL FIELD

The present invention relates to a liquid compression molding material which can be suitably used in the production of electronic components.

BACKGROUND ART

Many of semiconductor elements, such as integrated circuits, are sealed with a sealant. There are a plurality of molding methods for sealing semiconductor elements. In recent years, compression molding, which is more suitable for producing relatively large molded articles, has been increasingly adopted for sealing semiconductor elements. This is due to the fact that wafer-level chip-size package technology (with sealing of a wafer (prior to cutting into chips) as it is after the completion of circuit formation) is becoming popular, or the like.

Conventional curable resin compositions used for sealing semiconductor elements by compression molding are mainly solid resin compositions, such as those in a granular form. However, recently, with the development of new compression-forming techniques, liquid curable resin compositions are increasingly used. Hereafter, such a liquid curable resin composition used for sealing by compression molding is referred to as a "liquid compression molding material". This "liquid compression molding material" may be abbreviated as an "LCM (Liquid Compression Molding) material."

As a liquid compression molding (LCM) material, from the viewpoint of balance of various properties, such as electrical properties, moisture resistance, heat resistance, mechanical properties and adhesiveness, a liquid epoxy resin composition is frequently used. As an example of an epoxy resin composition used as an LCM material, there can be mentioned the liquid resin composition described in Patent Document 1.

PRIOR ART DOCUMENTS

Patent Documents

Patent Document 1: WO 2018/221681
Patent Document 2: JP 2015-105304

SUMMARY OF INVENTION

Problems to be Solved by the Invention

However, it has been found that a conventional LCM material has a problem of leakage from the parting (flash) line of the mold which results in defect in molding, when this material is subjected to compression molding. This leakage lowers molding efficiency and also causes loss of the LCM material, resulting in increased production costs.

In order to solve the problems in the related art, an object of the present invention is to provide a liquid epoxy resin composition suitable for use as a liquid compression molding material, the resin composition having appropriate rheological properties, causing no leakage from a mold when subjected to compression molding and enabling easy and efficient sealing of a semiconductor element.

Means to Solve the Problem

As a result of intensive research to solve the above-mentioned problems, the present inventors have arrived at the present invention.

That is, the present invention includes, but is not limited to, the following inventions.

A liquid compression molding material comprising the following components (A) to (C):

(A) an epoxy resin;

(B) a curing agent; and (C) a filler, the liquid compression molding material having a thixotropic index (TI) of 0.8 to 4.0.

The liquid compression molding material according to item 1 above, wherein component (C) contains 5 to 23 wt. % of particles with a particle size of 5 nm to 100 nm, based on the total weight of component (C).

The liquid compression molding material according to item 2 above, which can be obtained by a method comprising a step of mixing, in advance, at least a portion of said particles in component (C) with a particle size of 5 nm to 100 nm with at least a portion of component (A).

The liquid compression molding material according to any one of items 1 to 3 above, wherein component (C) is surface-treated with a coupling agent.

The liquid compression molding material according to any one of items 1 to 4 above, which has a viscosity of 10 to 1,000 Pa·s at 25° C.

The liquid compression molding material according to any one of items 1 to 5 above, wherein component (A) comprises an aliphatic epoxy resin.

The liquid compression molding material according to item 6 above, wherein the number average molecular weight of the aliphatic epoxy resin is 200 to 1,000.

The liquid compression molding material according to item 6 or 7 above, wherein the aliphatic epoxy resin comprises a compound represented by general formula (I) below:

[Chemical formula 1]

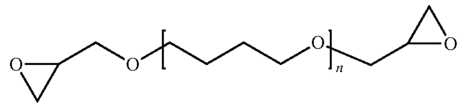

(I)

wherein n is an integer of 1 to 15.

The liquid compression molding material according to any one of items 1 to 8 above, wherein component (B) comprises a phenol compound.

The liquid compression molding material according to any one of items 1 to 9 above, wherein component (C) comprises silica.

Effect of the Invention

The liquid compression molding material of the present invention has appropriate rheological properties, and enables easy and efficient sealing of a semiconductor element with no leakage from a mold when subjected to compression molding.

BRIEF DESCRIPTION OF THE DRAWINGS

FIG. 1 is a diagram showing the mechanism of leakage of the liquid compression mold (LCM) material from the mold when a silicon wafer with the LCM material applied thereon is subjected to compression molding. (a) Application of the LCM material to a silicon wafer. (b) The state of the LCM material on the silicon wafer during the period from the time of application of the LCM material to the silicon wafer until the LCM material is stressed and stretched. When the TI of the LCM material is less than 0.8 (bottom), the LCM material spontaneously spreads over the silicon wafer to a position close to the inner surface of the mold. When the TI of the LCM material is appropriate (upper), the LCM material spontaneously spreads over the silicon wafer only to a position relatively distant from the inner surface of the mold. (c) The state of the LCM material on the silicon wafer immediately after the LCM material is stressed and stretched. When the TI of the LCM material is less than 0.8 (lower), the stretched LCM material reaches the inner surface of the mold in a very short time and, depending on the shape of the mold, the LCM material disadvantageously overflows from the mold before the mold is completely closed.

When the TI of the LCM material is appropriate (upper), the time required for the stretched LCM material to reach the inner surface of the mold is longer than the time for the above case. As a result, the stretched LCM material reaches the inner surface of the mold after the mold is completely closed, and leakage of the LCM material from the mold is avoided.

DESCRIPTION OF EMBODIMENTS

Embodiments of the prevent invention are described below in detail.

The prevent invention relates to a liquid compression molding (LCM) material comprising the following components (A) to (C):

(A) an epoxy resin;

(B) a curing agent; and (C) a filler, the LCM material having a thixotropic index (TI) of 0.8 to 4.0. The above-mentioned components (A) to (C) contained in the LCM material of the present invention are explained below.

[Epoxy Resin (Component (A)]

The LCM material of the present invention contains an epoxy resin. Hereinafter, this epoxy resin may be referred to as "component (A)".

As component (A) in the LCM material of the present invention, an epoxy resin used as a sealing material can be used. The epoxy resin is preferably a multifunctional epoxy resin which is bifunctional or more. As examples of the multifunctional epoxy resin, there can be mentioned monocyclic aromatic epoxy resins, such as catechol diglycidyl ether, resorcin diglycidyl ether, phthalic acid diglycidyl ester, 2,5-diisopropylhydroquinone diglycidyl ether and hydroquinone diglycidyl ether; alicyclic epoxy resins, such as 3',4'-epoxycyclohexylmethyl-3,4-epoxycyclohexanecarboxylate, 3,4-epoxy-6-methylcyclohexylmethyl 3,4-epoxy-6-methylcyclohexylcarboxylate, bis(3,4-epoxycyclohexyl) adipate, vinylcyclohexene monoepoxide and diepoxylimonene; bisphenol-type epoxy resins, such as bisphenol A type, bisphenol F type, bisphenol AD type and bisphenol S type ones; a mixture of oligomers obtained by partial polymerization of bisphenol-type epoxy resins; a bisphenol-type epoxy resin with hydrogenated ring(s); tetramethylbis(4-hydroxyphenyl)methane diglycidyl ether; tetramethylbis(4-hydroxyphenyl)ether diglycidyl ether; a biphenyl-type or tetramethylbiphenyl-type epoxy resin and a resin in which the rings thereof are hydrogenated; fluorene-type epoxy resins, such as bisphenol fluorene-type epoxy resins and biscresol fluorene-type epoxy resins; and naphthalene-type epoxy resins As further examples of the multifunctional epoxy resin, there can be mentioned polyfunctional glycidylamine-type epoxy resins, such as aminophenol-type epoxy resins (such as triglycidyl-p-aminophenol), aniline-type epoxy resins (such as diglycidyl aniline), toluidine-type epoxy resins (such as diglycidyl orthotoluidine) and diaminodiphenylmethane-type epoxy resins (such as tetraglycidyl diaminodiphenylmethane); dicyclopentadiene-type epoxy resins; and multifunctional glycidyl ethers, such as trimethylolalkane-type epoxy resins (such as trimethylolpropane triglycidyl ether, trimethylolmethane triglycidyl ether and trimethylolethane triglycidyl ether).

In addition, other epoxy resins, such as aliphatic epoxy resins, silylated epoxy resins, heterocyclic epoxy resins, diallyl bisphenol A-type epoxy resins, and polyarylene ether diglycidyl ethers, can also be used.

Among these epoxy resins, as examples of aliphatic epoxy resins, there can be mentioned:

bifunctional aliphatic epoxy resins each having two epoxy groups in a molecule, such as an alkylene glycol diglycidyl ether, a poly(alkylene glycol) diglycidyl ether and an alkenylene glycol diglycidyl ether;

polyfunctional aliphatic epoxy resins each having three or more epoxy groups in a molecule, such as a polyglycidyl ether of a multifunctional alcohol which is trifunctional or more (such as trimethylolpropane, pentaerythritol and dipentaerythritol), such as trimethylolpropane triglycidyl ether, pentaerythritol (tri or tetra)glycidyl ether, dipentaerythritol (tri, tetra, penta, or hexa)glycidyl ether;

and the like.

Among these aliphatic epoxy resins, bifunctional aliphatic epoxy resins are preferred.

As examples of the bifunctional aliphatic epoxy resin, there can be mentioned alkylene glycol diglycidyl ethers (alkanediol diglycidyl ethers) such as ethylene glycol diglycidyl ether, propylene glycol diglycidyl ether, 1,3-propanediol diglycidyl ether, 2-methyl-1,3-propanediol diglycidyl ether, 2-butyl-2-ethyl-1,3-propanediol diglycidyl ether, 1,4-butanediol diglycidyl ether (tetramethylene glycol diglycidyl ether), neopentyl glycol diglycidyl ether, 3-methyl-2,4-pentanediol diglycidyl ether, 2,4-pentanediol diglycidyl ether, 1,5-pentanediol diglycidyl ether (pentamethylene glycol diglycidyl ether), 3-methyl-1,5-pentanediol diglycidyl ether, 2-methyl-2,4-pentanediol diglycidyl ether, 2,4-diethyl-1,5-pentanediol diglycidyl ether, 1,6-hexanediol diglycidyl ether (hexamethylene glycol diglycidyl ether), 1,7-heptanediol diglycidyl ether, 3,5-heptanediol diglycidyl ether, 1,8-octanediol diglycidyl ether, 2-methyl-1,8-octanediol diglycidyl ether and 1,9-nonanediol diglycidyl ether; polyalkylene glycol diglycidyl ethers (including oligoalkylene glycol diglycidyl ethers), such as diethylene glycol diglycidyl ether, triethylene glycol diglycidyl ether, tetraethylene glycol diglycidyl ether, dipropylene glycol diglycidyl ether, polyethylene glycol diglycidyl ether, polypropylene glycol diglycidyl ether, poly(ethylene glycol/propylene glycol)diglycidyl ether, ditetramethylene glycol diglycidyl ether, tritetramethylene glycol diglycidyl ether, polytetramethylene glycol diglycidyl ether, dipentamethylene glycol diglycidyl ether, tripentamethylene glycol diglycidyl ether, polypentamethylene glycol diglycidyl ether, dihexamethylene glycol diglycidyl ether, trihexamethylene glycol diglycidyl ether and polyhexamethylene glycol diglycidyl ether; and the like.

In an embodiment, the bifunctional aliphatic epoxy resin is a (poly)alkylene glycol diglycidyl ether, preferably a (poly)alkylene glycol diglycidyl ether in which the number of the alkylene glycol unit(s) is from 1 to 20, more preferably a (poly)alkylene glycol diglycidyl ether in which the number of the alkylene glycol unit(s) is from 1 to 20 and the number of carbon atoms in the alkylene glycol unit is from 2 to 4.

In another embodiment, the bifunctional aliphatic epoxy resin is a polyalkylene glycol diglycidyl ether in which the number of the alkylene glycol units is from 2 to 20, preferably a polyalkylene glycol diglycidyl ether in which the number of the alkylene glycol units is from 2 to 20 and the number of carbon atoms in the alkylene glycol unit is from 2 to 4.

There is no particular limitation with respect to the molecular weight of the aliphatic epoxy resin (when the aliphatic epoxy resin is a polymer, the molecular weight is a number average molecular weight in terms of standard polystyrene measured by gel permeation chromatography (GPC) using tetrahydrofuran as an elution solvent). The molecular weight is preferably 200 to 10000, more preferably 200 to 1200, still more preferably from 200 to 1000, particularly preferably 300 to 900.

As a specific example of more preferred aliphatic epoxy resin, there can be mentioned a compound represented by general formula (I) below, i.e., a diglycidyl ether of a (poly)tetramethylene glycol:

[Chemical formula 2]

(I)

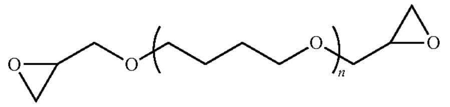

wherein n is an integer of 1 to 15.

As the compound represented by general formula (I), a commercially available product, such as the product available under the trade name "EPOGOSEY PT (general grade)" (Yokkaichi Chemical Company Limited, a diglycidyl ether of a polytetramethylene glycol, number average molecular weight: 700 to 1000), may be used.

In the LCM material of the present invention, as component (A), an epoxy resin may be used alone, and 2 or more epoxy resins may be used in combination. In the present invention, it is particularly preferred that component (A) comprises an aliphatic epoxy resin, and it is more preferred that the aliphatic epoxy resin comprises a compound represented by general formula (I) described above. Further it is preferred that the number average molecular weight of the aliphatic epoxy resin is 200 to 1000.

[Curing Agent (Component (B)]

The LCM material of the present invention contains a curing agent. There is no particular limitation with respect to this curing agent as long as the curing agent is capable of curing the above-mentioned epoxy resin (component (A)). Hereinafter, this curing agent may be referred to as "component (B)".

As examples of component (B) used for the LCM material of the present invention, there can be mentioned an imidazole compound, an amine compound, a phenol compound, an acid anhydride and the like. Among these, the imidazole compound may be rendered latent or in the form of a microencapsulated curing agent.

As examples of the imidazole compound, there can be mentioned imidazole; 2-substituted imidazole compounds, such as 2-methylimidazole, 2-ethylimidazole, 1-isobutyl-2-methylimidazole, 2-ethyl-4-methylimidazole, 2-phenylimidazole, 2-phenyl-4-methylimidazole, 2-phenyl-4-methyl-5-hydroxymethylimidazole, 1-benzyl-2-methylimidazole, 1-benzyl-2-phenylimidazole, 1,2-dimethylimidazol, 1-cyanoethyl-2-methylimidazole, 1-cyanoethyl-2-ethyl-4-methylimidazole, 1-cyanoethyl-2-undecylimidazole and 1-cyanoethyl-2-phenylimidazol; trimellitates, such as 1-cyanoethyl-2-undecylimidazolium trimellitate and 1-cyanoethyl-2-phenylimidazolium trimellitate; triazine ring-containing compounds, such as 2,4-diamino-6-[2-methyl-1-imidazolyl) ethyl]s-triazine, 2,4-diamino-6-[(2-undecyl-1-imidazolyl) ethyl]s-triazine and 2,4-diamino-6-[(2-ethyl-4-methyl-1-imidazolyl)ethyl]s-triazine; isocyanuric acid adduct of 2,4-diamino-6-[2-methyl-1-imidazolyl)ethyl]s-triazine, isocyanuric acid adduct of 2-phenylimidazole, isocyanuric acid adduct of 2-methylimidazole, isocyanuric acid adduct of 2-phenyl-4,5-dihydroxymethylimidazole, isocyanuric acid adduct of 2-phenyl-4-methyl-5-hydroxymethylimidazole, and the like.

Among these imidazole compounds, preferred are 2-phenyl-4-methylimidazole, 2,4-diamino-6-[2-methyl-1-imidazolyl)ethyl]s-triazine, 2-phenyl-4-methyl-5-hydroxymethylimidazole (including the isocyanuric acid adducts thereof) and the like.

As the above-mentioned microencapsulated curing agent, a dispersion of an amine compound in a powder form dispersed in a liquid epoxy resin can be used, for example. This amine compound may be selected from, for example, aliphatic primary amines, alicyclic primary amines, aromatic primary amines, aliphatic secondary amines, alicyclic secondary amines, aromatic secondary amines, imidazole compounds and imidazoline compounds. These amine compounds may be used in the form of a product of a reaction thereof with a carboxylic acid, sulfonic acid, isocyanate, epoxide or the like. These compounds can be used individually or in combination. For example, the above-mentioned amine compound may be used in combination with a product of a reaction thereof with a carboxylic acid, sulfonic acid, isocyanate or epoxide. The volume average particle diameter of the above-mentioned amine compound in a powder form is preferably 30 μm or less, more preferably 5 μm or less. Further, from the viewpoint of suppressing thickening at 25° C., it is preferred that the above-mentioned amine compound in a powder form has a melting point or softening point of 60° C. or more.

As the above-mentioned phenol compound, a phenol resin, particularly a novolac resin, which can be obtained by condensation of phenols or naphthols (such as phenol, cresol, naphthol, an alkylphenol, a bisphenol and a terpene phenol) with formaldehyde, is preferably used. As examples of the novolac resin, there can be mentioned a phenol novolac resin, an o-cresol novolac resin, a p-cresol novolac resin, an α-naphthol novolac resin, a pi-naphthol novolac resin, a t-butylphenol novolac resin, a bisphenol A-type novolac resin, a xylylene-modified novolac resin, a decalin-modified novolac resin and the like. As examples of other phenol resins, there can be mentioned a dicyclopentadiene cresol resin, a poly(p-vinylphenol), a poly(di-o-hydroxyphenyl)methane, a poly(di-m-hydroxyphenyl)methane, a poly (di-p-hydroxyphenyl)methane and the like.

As examples of the above-mentioned acid anhydride, there can be mentioned phthalic anhydride; hexahydrophthalic anhydride; alkyltetrahydrophthalic anhydrides, such as methylhexahydrophthalic anhydride; tetrahydrophthalic anhydride; alkyltetrahydrophthalic anhydrides, such as a trialkyltetrahydrophthalic anhydride and 3-methyltetrahydrophthalic anhydride; himic anhydride; succinic anhydride; trimellitic anhydride; pyromellitic anhydride and the like. Among these, preferred are methyltetrahydrophthalic anhydride, methylhexahydrophthalic anhydride and the like.

As examples of the above-mentioned amine compound, there can be mentioned tetramethyldiaminodiphenylmethane, tetraethyldiaminodiphenylmethane, diethyl-dimethyl-diaminodiphenylmethane, dimethyldiaminotoluene, diaminodibutyltoluene, diaminodipropyltoluene, diaminodiphenylsulfone, diaminoditolylsulfone, diethyl-diaminotoluene, bis(4-amino-3-ethylphenyl)methane, polytetramethyleneoxide-di-p-aminobenzoate and the like. Among these, preferred are bis(4-amino-3-ethylphenyl)methane and the like.

As further examples of the above-mentioned amine compound, there can also be mentioned 2,4,6-tris(dimethylaminomethyl)phenol, diethylamine, triethylamine, diethylenetetramine, triethylenetetramine, 4,4-dimethylaminopyridine and the like. The amine compound may be an amine adduct.

In the LCM material of the present invention, as component (B), a curing agent may be used alone, and 2 or more curing agents may be used in combination. In the present invention, it is preferred that component (B) comprises an imidazole compound, and it is more preferred that component (B) comprises both of an imidazole compound and phenol compound (preferably in a liquid form).

The LCM material of the present invention contains preferably 1 to 20 wt. %, more preferably 2 to 15 wt. %, particularly preferably 3 to 10 wt. % of component (B), based on 100 parts by weight of component (A).

[Filler (Component (C)]

The LCM material of the present invention contains a filler. Hereinafter, this filler may be referred to as "component (C)".

As examples of the filler, component (C) used in the present invention, there can be mentioned silica, alumina, talc, calcium carbonate, titanium white, red iron oxide, silicon carbide, boron nitride (BN), glass beads and the like, but the filler is not limited to them. In the present invention, it is preferred that component (C) comprises silica. This is because silica may function as a rheology modifier. Silica may be a natural silica (such as silica stone and quartz) or synthetic silica. Synthetic silica may be synthesized by any method, including a dry method and wet method.

Further, component (C) may be surface-treated with a surface-treating agent, for example a coupling agent such as a silane coupling agent (which may have a substituent, such as a phenyl group, vinyl group, methacryloyl group and the like). In the present invention, it is preferred that at least a portion of component (C) is surface-treated.

In an embodiment, component (C) comprises silica powder. Silica powder is commercially available.

In the present invention, it is more preferred that component (C) contains a powder of fused silica and/or a powder of silica produced by a vaporized metal combustion method. A vaporized metal combustion method is a method for producing a powder of silica consisting of fine spherical particles of silica by igniting a powder of metallic silicon dispersed in a stream of oxygen to thereby oxidize the powder, and subjecting the resultant oxide (which optionally contains unreacted metallic silicon) to melting or vaporization by heating using the heat of reaction of the above-mentioned oxidation, followed by cooling to a temperature below the melting point of the oxide. On the other hand, as examples of the powder of fused silica, there can be mentioned those composed of spherical particles of silica, those composed of irregular particles of silica and the like. From the viewpoint of fluidity of the LCM material, it is more preferred that component (C) contains silica powder consisting of spherical particles of silica (especially those with high sphericity).

In the LCM material of the present invention, as component (C), one type of filler may be used or two or more types of fillers may be used in combination. When component (C) comprises two or more types of fillers, the fillers may be different in the substances contained in the particles that compose them and, alternatively, when the fillers are composed of particles containing the same substance, the fillers may be different in the production method or in some other properties (for example, the particle size distribution described below). In an embodiment, component (C) comprises two or more types of fillers.

There is no particular limitation with respect to the properties of the particles constituting component (C), such as the particle size distribution. However, in the present invention, in view of appropriate thixotropic index (described below) of the LCM material, component (C) contains preferably 5 to 23 wt. %, more preferably 8 to 19 wt. % of particles with a particle size of 5 nm to 100 nm, more preferably 10 to 50 nm, based on the total weight of component (C). In this case, with respect to the particles in component (C) other than the particles with a particle size of 5 nm to 100 nm, there is no particular limitation with respect to the properties thereof except for the content in component (C).

The particle size distribution of the particles constituting component (C) can be obtained by analyzing, using an image processing software, a micrograph (for example, an electron micrograph) of a sample of component (C) taken and quantifying and statistically processing the sizes of all or a portion of the particles in the micrograph. When component (C) comprises two or more types of fillers, the particle size distribution of the particles constituting component (C) is the particle size distribution of the particles constituting component (C) as a mixture of all of those fillers.

It is preferred that the particles in component (C) with a particle size of 5 nm to 100 nm are surface-treated.

The LCM material of the present invention comprises preferably 65 to 90 wt. %, more preferably 68 to 88 wt. %, particularly preferably 70 to 85 wt. % of component (C), based on the total weight of the LCM material.

The LCM material of the present invention has a thixotropic index (TI) of 0.8 to 4.0. TI is preferably 0.8 to 2.0. In the present invention, TI of the LCM material is represented by the following formula:

$$TI=\eta_1/\eta_{10}$$

(wherein:

$\eta 1$ is the viscosity of the LCM material measured using a rotational viscometer under the conditions with a temperature of 25° C. and a number of rotation of 1 rpm; and $\eta_{10}$ is the viscosity of the LCM material measured under the conditions substantially the same as those for 11, except that the number of rotation is 10 rpm).

As described above, when a conventional LCM material is subjected to sealing treatment by compression molding, leakage from the parting (flash) line of the mold may occur.

This means that the rheological properties of conventional LCM materials are not suitable for such a sealing treatment.

As a result of various investigations, the present inventors have found that a specific epoxy resin composition with a TI of 0.8 to 4.0 exhibits rheological properties suitable for sealing treatment by compression molding and is useful as an LCM material.

When the TI of the LCM material is less than 0.8, the LCM material leaks from the mold during compression molding. On the other hand, when the TI of the LCM material is more than 4.0, discharge of the LCM material from an application means becomes difficult.

In the sealing treatment by compression molding, from the time of application of the LCM material to an object to be sealed until the time of application of stress to the LCM material, a certain period of time is required. During this period, the applied LCM material spontaneously spreads, to some extent, over the object to be sealed. When the TI of the LCM material is less than 0.8, the LCM material spreads to a position close to the inner surface of the mold. Therefore, when the LCM material is stretched by the applied stress, the stretched LCM material reaches the inner surface of the mold in a very short time and, depending on the shape of the mold, the LCM material disadvantageously overflows from the mold before the mold is completely closed.

On the other hand, when the TI of the LCM material is within the above-mentioned range, during the period from the time of application to the object to be sealed until the time of application of stress, the LCM material spontaneously spreads over the object to be sealed only to a position relatively distant from the inner surface of the mold. Therefore, the time required for such an LCM material, which is stretched by the applied stress, to reach the inner surface of the mold is longer than that time for an LCM material with the TI of less than 0.8. As a result, the stretched LCM material reaches the inner surface of the mold after the mold is completely closed, and leakage of the LCM material from the mold is avoided.

The above fact was found for the first time by the present inventors.

According to the definition of the TI described above, when the TI of an LCM material is 1 or less, the viscosity of the LCM material under relatively high shear stress is the same as or higher than that of the LCM material under relatively low shear stress. However, since the viscosity of the LCM material varies depending on the measurement conditions, the behavior of the LCM material under actual compression molding conditions may not be consistent with the behavior predicted from the TI by the above definition.

As an example of a means for achieving such an appropriate rheological properties, i.e., an appropriate TI, of the LCM materials, there can be mentioned appropriately adjusting the particle size distribution of component (C) so as to achieve the particle size distribution containing, for example, particles as small as 5 nm to 100 nm in size (in an amount of, for example, 5 to 23 wt. % based on the total weight of component (C)), as described above. This means is particularly useful when component (C) comprises silica. This is due to the fact that silica functions also as a rheology modifier.

An epoxy resin composition to be used as a sealant for semiconductors, which is prepared using the filler as described above containing fine particles, is disclosed, for example, in Patent Document 2. However, this epoxy resin composition is intended for use as an underfill agent, and an underfill agent must have high fluidity (which is evaluated, for example, as "Viscosity at 120° C." described later) as compared to an LCM material. Therefore, in this epoxy resin composition, increase of the content of fine particles in the filler to or over a certain degree (for example, more than 20% by weight of the total weight of the filler) is not preferred.

In the LCM material of the present invention, the viscosity at 25° C. is preferably 10 to 1,000 Pa·s, more preferably 30 to 900 Pa·s, still more preferably 50 to 800 Pa·s. In the present invention, the viscosity at 25° C. is measured in substantially the same manner as in the measurement of the above-mentioned rho.

Further, in the LCM material of the present invention, the viscosity at 120° C. is preferably 0.3 to 6.0 Pa·s, more preferably 0.5 to 5.5 Pa·s, still more preferably 0.8 to 5.1 Pa·s. In the present invention, the viscosity at 120° C. means a viscosity (unit: Pa·s) measured at 120° C. using a rheometer after application of oscillation (frequency: 10 Hz) for 1 minute at 120° C. under the conditions wherein the shear strain is kept constant. By contrast, usually in an underfill material, the viscosity at 120° C. is less than 0.3 Pa·s.

In addition to the above-mentioned components (A) to (C), which are essential components, the LCM material of the present invention may contain optional components, such as those mentioned below, if desired.

Curing Accelerator

The LCM material of the present invention may, if desired, comprise a curing accelerator. There is no particular limitation with respect to the curing accelerator used in the present invention and any conventional curing accelerator can be used, as long as the curing accelerator is a compound capable of accelerating the curing of the epoxy resin (the above-mentioned component (A)) by the curing agent (the above-mentioned component (B)). As examples of the curing accelerator, there can be mentioned a basic compound, such as an amine compound, a phosphorus compound and an organometallic compound.

As examples of the above-mentioned amine compound, there can also be mentioned 2,4,6-tris(dimethylaminomethyl)phenol, diethylamine, triethylamine, diethylenetetramine, triethylenetetramine and 4,4-dimethylaminopyridine. The amine compound may be an amine adduct.

As examples of the above-mentioned phosphorus compound, there can be mentioned a trialkylphosphine compound such as tributylphosphine, and a triarylphosphine compound such as triphenylphosphine.

As examples of the above-mentioned organometallic compound, there can be mentioned zinc naphthenate, cobalt naphthenate, tin octylate, cobalt octylate, bis-acetylacetonate cobalt (II) and tris-acetylacetonate cobalt (III).

When the LCM material of the present invention comprises a curing accelerator, the amount of the curing accelerator is preferably 1 to 100 parts by weight, more preferably 5 to 50 parts by weight, with respect to 100 parts by weight of the total amount of components (A) to (C).

Pigment

The LCM material of the present invention may, if desired, comprise a pigment. The chromaticity of the resin composition of the present invention can be adjusted by incorporation of a pigment. Further, considering the possibility that wiring in electronic components is affected by light, the use of a pigment is important. There is no particular limitation with respect to the pigment, and carbon black, titanium black such as titanium nitride, a black organic pigment, a mixed color organic pigment, an inorganic pigment and the like can be used. The pigment is not limited to them. Examples of the black organic pigment include perylene black, aniline black and the like; examples of the mixed color organic pigment include those obtained by mixing at least two kinds of pigments selected from red, blue, green, purple, yellow, magenta, cyan and the like to obtain a pseudo-black color; and examples of the inorganic pigment include fine particles of graphite, metals and oxides (including complex oxides), sulfides, nitrides and the like of the metals. As examples of the metals, there can be mentioned titanium, copper, iron, manganese, cobalt, chromium, nickel, zinc, calcium, silver and the like. In the LCM material of the present invention, the pigments can be used individually or in combination. Further, the pigment may be used in combination with another colorant, such as a dye.

From the viewpoint of heat resistance, the pigment is preferably carbon black.

Stabilizer

The LCM material of the present invention may, if desired, comprise a stabilizer. A stabilizer may be contained in the LCM material of the present invention to improve its storage stability and to prolong its pot life. Various stabilizers known in the art as stabilizers for one-part epoxy-based adhesives may be used, and at least one selected from the group consisting of a liquid borate ester compound, an aluminum chelate and an organic acid is preferable because of their high effectiveness in improving storage stability.

As examples of liquid borate ester compounds, there can be mentioned 2,2'-oxybis(5,5'-dimethyl-1,3,2-oxaborinane), trimethyl borate, triethyl borate, tri-n-propyl borate, triisopropyl borate, tri-n-butyl borate, tripentyl borate, triallyl borate, trihexyl borate, tricyclohexyl borate, trioctyl borate, trinonyl borate, tridecyl borate, tridodecyl borate, trihexadecyl borate, trioctadecyl borate, tris(2-ethylhexyloxy)borane, bis(1,4,7,10-tetraoxaundecyl)(1,4,7,10,13-pentaoxatetradecyl)(1,4,7-trioxaundecyl)borane, tribenzyl borate, triphenyl borate, tri-o-tolyl borate, tri-m-tolyl borate, triethanolamine borate and the like. A liquid borate ester compound is preferable, because it is liquid at room temperature (25° C.) and therefore allows the viscosity of the LCM material to be kept low. As the aluminum chelate, aluminum chelate A may be used, for example. As the organic acid, barbituric acid may be used, for example.

When the LCM material of the present invention comprises a stabilizer, the amount of the stabilizer is preferably 0.01 to 30 parts by weight, more preferably 0.05 to 25 parts by weight, still more preferably 0.1 to 20 parts by weight, with respect to 100 parts by weight of component (A).

Silicone-Based Additive

The LCM material of the present invention may, if desired, comprise a silicone-based additive. From the viewpoint of improving fluidity of the LCM material, it is preferred that a silicone-based additive is contained. It is preferred that the silicone-based additive is a dialkylpolysiloxane (as examples of alkyl groups bonded to Si, there can be mentioned methyl, ethyl and the like), especially a dimethylpolysiloxane. Further, the silicone-based additive may be a modified dialkylpolysiloxane, such as an epoxy-modified dialkylpolysiloxane. As specific examples of the silicone-based additive, there can be mentioned KF69 (dimethylsilicone oil, manufactured by Shin-Etsu Silicone), SF8421 (epoxy-modified silicone oil, manufactured by Toray Dow Silicone Co., Ltd.) and the like. The silicone-based additives can be used individually or in combination.

When the LCM material of the present invention comprises a silicone-based additive, the amount of the silicone-based additive is preferably 0.1 to 1.0 part by weight, more preferably 0.25 to 1 part by weight, with respect to 100 parts by weight of component (A).

Coupling Agent

The LCM material of the present invention may, if desired, comprise a coupling agent. It is preferred from the perspective of improving adhesive strength that a coupling agent, in particular a silane coupling agent, is contained. As the coupling agent, various silane coupling agents, such as epoxy-based, amino-based, vinyl-based, methacrylic-based, acrylic-based and mercapto-based coupling agents, may be used. As specific examples of the silane coupling agent, there can be mentioned 3-glycidoxypropyltrimethoxysilane, 3-aminopropyltrimethoxysilane, vinyltrimethoxysilane, 3-triethoxysilyl-N-(1,3-dimethyl-butylidene)propylamine, 2-(3,4-epoxycyclohexyl)ethyltrimethoxysilane, p-styryltrimethoxysilane, 3-methacryloxypropylmethyltrimethoxysilane, 3-acryloxypropyltrimethoxysilane, 8-glycidoxyoctyltrimethoxysilane, 3-ureidopropyltriethoxysilane, 3-mercaptopropyltrimethoxysilane, bis(triethoxysilylpropyl)tetrasulfide, 3-isocyanatopropyltriethoxysilane and the like. These silane coupling agents may be used individually or in combination.

When the LCM material of the present invention comprises a coupling agent, the amount of the coupling agent is preferably from 0.01 to 5 parts by weight, more preferably from 0.1 to 5 parts by weight, with respect to 100 parts by weight of component (A).

Migration Suppressing Agent

The LCM material of the present invention may, if desired, comprise a migration suppressing agent. Migration is a phenomenon of dissolution of metal(s) from wiring pattern by electrochemical reaction, resulting in lowering of the value of the electrical resistance. From the viewpoint of improving reliability of electronic components, it is preferred that a migration suppressing agent is contained. As specific examples of the migration suppressing agent, there can be mentioned xanthines, such as caffeine, theophylline, theobromine and paraxanthine; tocols, such as 5,7,8-trimethyltocol (α-tocopherol), 5,8-dimethyltocol (β-tocopherol), 7,8-dimethyltocol (γ-tocopherol) and 8-methyltocol (δ-tocopherol); tocotrienols, such as 5,7,8-trimethyltocotrienol (α-tocotrienol), 5,8-dimethyltocotrienol (β-tocotrienol), 7,8-dimethyltocotrienol (γ-tocotrienol) and 8-methyltocotrienol (δ-tocotrienol); benzotriazoles, such as benzotriazole, 1H-benzotriazole-1-methanol and alkylbenzotriazoles; triazines, such as 2,4-diamino-6-vinyl-S-triazine, 2,4-diamino-6-[2'-ethyl-4-methylimidazole-(1)]-ethyl-S-triazine and 2,4-diamino-6-methacryloyloxyethyl-S-triazine; isocyanuric acid adducts of the above-mentioned benzotriazoles or triazines; and the like. These migration suppressing agents can be used individually or in combination.

When the LCM material of the present invention comprises a migration suppressing agent, the amount of the migration suppressing agent is preferably from 0.01 to 5 parts by weight, more preferably from 0.1 to 5 parts by weight, with respect to 100 parts by weight of component (A).

Other Additives

The LCM material of the present invention may, if desired, comprise other additives, such as an ion trapping agent, a leveling agent, an antioxidant, an antifoaming agent, an thixotropic agent, a viscosity adjusting agent, a flame retardant, a solvent and the like, insofar as they do not depart from the spirit of the present invention. The type and amount of each additive are in accordance with usual practice in the art.

There is no particular limitation with respect to the method for producing the liquid compression molding (LCM) material of the present invention. For example, the LCM material of the present invention may be obtained by introducing components (A) to (C) and, if desired, other additives into a suitable mixer simultaneously or separately, followed by stirring and mixing while, if necessary, heating and melting, to yield a homogeneous composition. There is no particular limitation with respect to the mixer, and a Raikai mixer (grinder) equipped with a stirrer and a heater, a Henschel mixer, a three-roll mill, a ball mill, a planetary mixer, a bead mill or the like can be used. These devices may be used in combination, as appropriate.

With respect to the LCM material of the present invention, when component (C) contains particles with a particle size of 5 nm to 100 nm (for example, in an amount of 5 to 23 wt. %, based on the total weight of component (C)), it is preferred that the LCM material of the present invention is obtained by a method comprising a step of mixing, in advance, at least a portion of the particles in component (C) with a particle size of 5 nm to 100 nm with at least a portion of component (A).

It is preferred that the LCM material of the present invention can be obtained by the method described above.

The liquid compression molding material thus obtained is thermosetting and, under the conditions with the temperature of 100 to 170° C., cured preferably within 0.1 to 3 hours, more preferably within 0.25 to 2 hours.

The liquid compression molding material of the present invention is suitable for the production of an electronic component, especially the production of a semiconductor element with sealing by compression molding. More specifically, the liquid compression molding material of the present invention is particularly useful for the sealing treatment of a wafer after the completion of circuit formation, the wafer prior to cutting into chips, in the production, by wafer-level chip-size packaging, of a semiconductor element with a miniaturized package.

The present invention also provides a cured product obtained by curing the LCM material of the present invention. The present invention further provides an electronic component comprising the cured product of the present invention.

EXAMPLES

Hereinafter, the present invention will be described by way of examples, but the present invention is not limited thereto. In the following examples, parts and percentages, unless otherwise specified, represent parts by weight and percentages by weight.

Examples 1 to 17 and Comparative Examples 1 to 5

Liquid compression molding (LCM) materials were prepared by mixing each of the components in the amounts according to the formulations shown in Table 1 using a three-roll mill. In Table 1, the amount of each component is expressed by weight (unit: g).

Epoxy Resin (Component (A))

The compounds used as component (A) in Examples and Comparative Examples are as follows.

(A-1): Diglycidyl ether of a polytetramethylene glycol (number average molecular weight: 700 to 1000) (trade name: EPOGOSEY PT (general grade), manufactured by Yokkaichi Chemical Company Limited)

(A-2): Aminophenol-type epoxy resin (trade name: 630, manufactured by Mitsubishi Chemical Corporation)

Curing Agent (Component (B))

The compounds used as component (B) in Examples and Comparative Examples are as follows.

(B-1): Imidazole compound (trade name: CUREZOL 2P4MZ, manufactured by Shikoku Chemicals Corporation)

(B-2): Imidazole compound (trade name: CUREZOL 2MZ-A, manufactured by Shikoku Chemicals Corporation)

(B-3): Imidazole compound (trade name: CUREZOL 2P4MHZ-PW, manufactured by Shikoku Chemicals Corporation)

(B-4): Liquid phenol novolac resin (trade name: MEH-8005, manufactured by Meiwa Plastic Industries, Ltd.)

(B-5): Amine compound (trade name: KAYAHARD A-A, manufactured by Nippon Kayaku Co., Ltd.)

(B-6): Acid anhydride (trade name: HN-5500, manufactured by Hitachi Chemical Company, Ltd.)

Filler (Component (C))

The compounds used as component (C) in Examples and Comparative Examples are as follows. The compounds shown are classified into 2 groups, filler with average particle size of more than 0.1 μm (100 nm) and filler with average particle size of 0.1 μm (100 nm) or less.

<Filler with Average Particle Size of Greater than 0.1 μm (100 nm)>

(C-1): Silica filler (trade name: SO-E2, manufactured by Admatechs Company Limited, average particle size: 0.6 μm)

(C-2): Silica filler (trade name: SO-E5, manufactured by Admatechs Company Limited, average particle size: 1.5 μm)

(C-3): Silica filler (trade name: SO-E6, manufactured by Admatechs Company Limited, average particle size: 2 μm)

<Filler with Average Particle Size of 0.1 μm (100 nm) or Less>

(C-4): Silica filler (trade name: Aerosil (registered trademark) R805, manufactured by Toshin Kasei Co., Ltd., average particle size: 7 nm, surface-treated with octylsilane)

(C-5): Silica filler (trade name: YA010C, manufactured by Admatechs Company Limited, average particle size: 10 nm, surface-treated)

(C-6): Silica filler (trade name: YA050C, manufactured by Admatechs Company Limited, average particle size: 50 nm, surface-treated)

(C-7): Silica filler (trade name: YC100C, manufactured by Admatechs Company Limited, average particle size: 100 nm, surface-treated)

In Examples and Comparative Examples, properties of the LCM material were measured as follows.

[Viscosity of LCM Material at 25° C.]

With respect to the LCM material produced, a viscosity (unit: Pa·s) was measured using an HB-type rotational viscometer manufactured by Brookfield Engineering Laboratories, Inc. (using a spindle SC4-14) under the conditions at 25° C. and 10 rounds per minute. Results are shown in Table 1.

[Viscosity of LCM Material at 120° C.]

With respect to the LCM material produced, a viscosity (unit: Pa·s) was measured at 120° C. in the oscillation strain control mode using a MARS rheometer manufactured by Haake Technik GmbH after application of oscillation (frequency: 10 Hz) at 120° C. for 1 minute. Results are shown in Table 1.

[Thixotropic Index (TI) of LCM Material]

With respect to the LCM material produced, a viscosity (unit: Pa·s) was measured under the conditions substantially the same as those for "Viscosity of LCM material at 25° C." described above, except that the rate of rotation was 1 round per minute. This viscosity was divided by "Viscosity of LCM material at 25° C." described above. The thixotropic index (TI) of the LCM material was calculated as a value thus obtained. Results are shown in Table 1.

[Evaluation of Moldability of LCM Material]

The LCM material produced, in an amount corresponding to the volume of a disk having a diameter of 292 mm and a thickness of 400 μm, was applied on a silicon wafer (in the form of a disk having a diameter of 300 mm and a thickness of 780 μm). The silicon wafer was placed in a mold mounted in a compression molding machine WCM 300 (manufactured by Apic Yamada Corporation) and subjected to compression molding (sealing treatment) under the conditions with a temperature of 120° C. and a pressure of 350 kN.

The presence or absence of leakage of the LCM material from the mold during the compression molding was visually monitored. When leakage occurred, the moldability of the LCM material was evaluated as × and, when no leakage occurred, the moldability of the LCM material was evaluated as ○. The moldability of the LCM material was evaluated as × also when the moldability could not be evaluated by the above method.

[Evaluation of Fluidity of LCM Material]

40 g of the LCM material produced was charged into a dispensing machine ML-5000 XII (manufactured by Musashi Engineering, Inc.) equipped with a nozzle with an inner diameter of 10 mm, and discharged from the machine at a discharge pressure of 0.2 MPa.

When all the charged LCM material was discharged within 5 minutes, the fluidity of the LCM material was evaluated as ○ and, when it took more than 5 minutes for all the charged LCM material to be discharged, the fluidity of the LCM material was evaluated as ×. The fluidity of the LCM material was evaluated as × also when the fluidity could not be evaluated by the above method.

TABLE 1

| | | Ex. 1 | Com. Ex. 1 | Ex. 2 | Ex. 3 | Com. Ex. 2 | Ex. 4 | Ex. 5 | Ex. 6 |
|---|---|---|---|---|---|---|---|---|---|
| Component (A) | (A-1) | 33 | 20 | 33 | 33 | 33 | 20 | 20 | 33 |
| | (A-2) | 67 | 80 | 67 | 67 | 67 | 80 | 80 | 67 |
| Component (B) | (B-1) | | 4 | 4 | 4 | 4 | 4 | 4 | 4 |
| | (B-2) | 4 | | | | | | | |
| | (B-3) | | | | | | | | |
| | (B-4) | 4 | 4 | 4 | 4 | | | | |
| | (B-5) | | | | | | | | |
| | (B-6) | | | | | | | | |
| Component (C) | (C-1) | 289 | | | | | | | |
| (average particle size | (C-2) | | 456 | 430 | 452 | 385 | 417 | 420 | 400 |
| greater than 0.1 μm) | (C-3) | | | | | | | | |
| Component (C) | (C-4)[a] | | | | | | | | |
| (average particle size | (C-5)[a] | | | | | | | | |
| 0.1 μm or less) | (C-6)[a] | 56 | | 76 | 55 | 121 | 39 | 51 | |
| | (C-7)[a] | | | | | | | | 88 |
| Viscosity at 25° C. (Pa · s) | | 150 | 203 | 223 | 758 | — | 325 | 139 | 190 |
| Thixotropic index | | 1.0 | 0.3 | 2.0 | 1.7 | — | 1.1 | 2.2 | 1.5 |
| Viscosity at 120° C. (Pa · s) | | 1.5 | 1.2 | 2.1 | 5.1 | — | 1.0 | 1.0 | 2.6 |
| Moldability | | ○ | X | ○ | ○ | X | ○ | ○ | ○ |
| Fluidity | | ○ | ○ | ○ | ○ | X | ○ | ○ | ○ |

| | | Com. Ex. 3 | Ex. 7 | Ex. 8 | Com. Ex. 4 | Ex. 9 | Com. Ex. 5 | Ex. 10 | Ex. 11 |
|---|---|---|---|---|---|---|---|---|---|
| Component (A) | (A-1) | 20 | 20 | 20 | 20 | 20 | 20 | 20 | 20 |
| | (A-2) | 80 | 80 | 80 | 80 | 80 | 80 | 80 | 80 |
| Component (B) | (B-1) | 4 | 4 | 4 | 4 | 4 | 4 | 4 | 4 |
| | (B-2) | | | | | | | | |
| | (B-3) | | | | | | | | |
| | (B-4) | | | | | | | | |
| | (B-5) | | | | | | | | |
| | (B-6) | | | | | | | | |
| Component (C) | (C-1) | | | | | | | | |
| (average particle size | (C-2) | | | | | | | | |
| greater than 0.1 μm) | (C-3) | 456 | 369 | 388 | 458 | 447 | 450 | 439 | 439 |
| Component (C) | (C-4)[a] | | 7 | 13 | 30 | | | | |
| (average particle size | (C-5)[a] | | | | | | | | |
| 0.1 μm or less) | (C-6)[a] | | | | | 41 | | | |
| | (C-7)[a] | | | | | | 6 | 17 | 67 |
| Viscosity at 25° C. (Pa · s) | | 75 | 81 | 133 | — | 216 | 83 | 81 | 87 |
| Thixotropic index | | 0.5 | 1.1 | 2.9 | — | 2.3 | 0.7 | 0.8 | 1.6 |
| Viscosity at 120° C. (Pa · s) | | 0.8 | 0.9 | 1.3 | — | 1.6 | 0.8 | 0.8 | 1.0 |
| Moldability | | X | ○ | ○ | X | ○ | X | ○ | ○ |
| Fluidity | | ○ | ○ | ○ | X | ○ | ○ | ○ | ○ |

| | | Ex. 12 | Ex. 13 | Ex. 14 | Ex. 15 | Ex. 16 | Ex. 17 |
|---|---|---|---|---|---|---|---|
| Component (A) | (A-1) | 20 | 20 | 100 | 33 | 33 | 33 |
| | (A-2) | 80 | 80 | 0 | 67 | 67 | 67 |
| Component (B) | (B-1) | 4 | 4 | 4 | | 4 | 4 |
| | (B-2) | | | | | | |

TABLE 1-continued

| | | | | | | | |
|---|---|---|---|---|---|---|---|
| | (B-3) | | | | 4 | | |
| | (B-4) | | | 4 | 4 | | |
| | (B-5) | | | | | 4 | |
| | (B-6) | | | | | | 4 |
| Component (C) | (C-1) | | | | | | |
| (average particle size | (C-2) | | | 430 | 430 | 430 | 430 |
| greater than 0.1 μm) | (C-3) | 428 | 434 | | | | |
| Component (C) | (C-4)[a] | | | | | | |
| (average particle size | (C-5)[a] | | | | | | |
| 0.1 μm or less) | (C-6)[a] | | | 76 | 76 | 76 | 76 |
| | (C-7)[a] | 86 | 80 | | | | |
| Viscosity at 25° C. (Pa · s) | | 100 | 119 | 230 | 218 | 223 | 209 |
| Thixotropic index | | 1.9 | 1.8 | 2.4 | 2.0 | 1.9 | 1.9 |
| Viscosity at 120° C. (Pa · s) | | 1.3 | 1.4 | 2.2 | 2.1 | 2.2 | 2.0 |
| Moldability | | ○ | ○ | ○ | ○ | ○ | ○ |
| Fluidity | | ○ | ○ | ○ | ○ | ○ | ○ |

[a]Surface-treated

Table 1 clearly shows that in each of Examples 1 to 17 in which the thixotropic index (TI) of the LCM material is 0.8 to 4.0, the LCM material not only exhibited appropriate fluidity sufficient for achieving easy discharge from the dispensing machine but also had excellent moldability and, when the LCM material was subjected to compression molding together with the silicon wafer, no leakage of the LCM material from the mold was observed.

On the other hand, in each of Comparative Examples 1, 3 and 5 in which the TI of the LCM material is less than 0.8, moldability was insufficient and leakage of the LCM material from the mold was observed when the LCM material was subjected to compression molding together with the silicon wafer. Further, in each of Comparative Examples 2 and 4, measurement of viscosity or evaluation of moldability and fluidity could not be carried out, since the LCM material was almost in a solid form.

INDUSTRIAL APPLICABILITY

The LCM material of the present invention has appropriate rheological properties. Because of this fact, the LCM material of the present invention enables easy and efficient sealing of a semiconductor element with no leakage from a mold when subjected to compression molding. Therefore, the LCM material of the present invention is useful in the production of a semiconductor element with sealing by compression molding, especially in the production, by wafer-level chip-size packaging, of a semiconductor element with a miniaturized package.

REFERENCE SIGNS LIST

1 Liquid compression molding (LCM) material
2 Silicon wafer
3 Upper mold
4 Lower mold

The invention claimed is:

1. A method for producing a semiconductor element by wafer-level chip-size packaging, the method comprising:
- applying a liquid compression molding material to a wafer after completion of circuit formation; and
- subjecting the wafer to sealing treatment by compression molding,
- wherein the liquid compression molding material comprises (A) an epoxy resin, (B) a curing agent, and (C) a filler,
- wherein the liquid compression molding material has a thixotropic index (TI) of 0.8 to 4.0, and
- wherein component (C) contains silica particles with a particle size of 50 nm to 100 nm and silica particles having an average particles size of 0.6 to 2 μm, the content of the silica particles with a particle size of 50 nm to 100 nm being 8 to 19 wt. % based on the total weight of component (C).

2. The method according to claim 1, wherein the liquid compression molding material can be obtained by a method comprising a step of mixing, in advance, at least a portion of said particles in component (C) with a particle size of 50 nm to 100 nm with at least a portion of component (A).

3. The method according to claim 1, wherein component (C) is surface-treated with a coupling agent.

4. The method according to claim 1, wherein the liquid compression molding material has a viscosity of 10 to 1,000 Pas at 25° C.

5. The method according to claim 1, wherein component (A) comprises an aliphatic epoxy resin.

6. The method according to claim 5, wherein the number average molecular weight of the aliphatic epoxy resin is 200 to 1,000.

7. The method according to claim 5, wherein the aliphatic epoxy resin comprises a compound represented by formula (I) below:

(I)

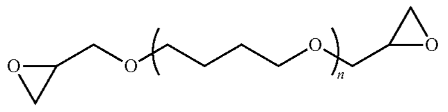

wherein n is an integer of 1 to 15.

8. The method according to claim 1, wherein component (B) comprises a phenol compound.

* * * * *